(12) United States Patent
Mueller et al.

(10) Patent No.: US 11,839,334 B2
(45) Date of Patent: Dec. 12, 2023

(54) COOKWARE ITEM HAVING AN OUTPUT UNIT AND METHOD FOR OPERATING THE COOKWARE ITEM

(71) Applicant: Miele & Cie. KG, Guetersloh (DE)

(72) Inventors: Christoph Mueller, Roedinghausen (DE); Britta Hoelscher, Hannover (DE)

(73) Assignee: MIELE & CIE. KG, Guetersloh (DE)

( * ) Notice: Subject to any disclaimer, the term of this patent is extended or adjusted under 35 U.S.C. 154(b) by 0 days.

(21) Appl. No.: 18/005,354

(22) PCT Filed: Jun. 30, 2021

(86) PCT No.: PCT/EP2021/067976
§ 371 (c)(1),
(2) Date: Jan. 13, 2023

(87) PCT Pub. No.: WO2022/022932
PCT Pub. Date: Feb. 3, 2022

(65) Prior Publication Data
US 2023/0346169 A1 Nov. 2, 2023

(30) Foreign Application Priority Data
Jul. 29, 2020 (DE) .......................... 102020119938.4

(51) Int. Cl.
A47J 45/06 (2006.01)
A47J 45/08 (2006.01)
(Continued)

(52) U.S. Cl.
CPC ............. *A47J 45/068* (2013.01); *A47J 37/10* (2013.01); *A47J 45/061* (2013.01); *A47J 45/08* (2013.01);
(Continued)

(58) Field of Classification Search
CPC ........ A47J 45/068; A47J 37/10; A47J 45/061; A47J 45/08; A47J 2202/00; F21V 33/0036
(Continued)

(56) References Cited

U.S. PATENT DOCUMENTS 5,441,344 A * 8/1995 Cook, III ................. G01K 1/14
374/E7.016
10,610,057 B1 * 4/2020 Billman .................. F24C 7/083
(Continued)

FOREIGN PATENT DOCUMENTS

CN 108378678 A * 8/2018 .............. A47J 27/00
CN 108378678 A 8/2018
(Continued)

*Primary Examiner* — J. Gregory Pickett
*Assistant Examiner* — Niki M Eloshway
(74) *Attorney, Agent, or Firm* — LEYDIG, VOIT & MAYER, LTD.

(57) ABSTRACT

A cookware item includes: a cooking container for receiving food to be cooked and/or a lid for closing the cooking container; at least one handle for handling the cookware item, a handle body of the handle being force-transmittingly connected to the cooking container and/or to the lid of the cookware item by a handle connection part of the handle; an insulating part of the cookware item being disposed between the handle connection part and/or the lid to reduce a transfer of heat to the handle body; and an output unit at least partially integrated into the handle body and for visually outputting information to a user of the cookware item, the output unit having at least one light source, the light source being controllable by a controller of the cookware item and configured to be supplied with electrical power by a power source of the cookware item.

15 Claims, 6 Drawing Sheets

(51) Int. Cl.
   *F21V 33/00*       (2006.01)
   *A47J 37/10*       (2006.01)
(52) U.S. Cl.
   CPC ....... *F21V 33/0036* (2013.01); *A47J 2202/00* (2013.01)
(58) Field of Classification Search
   USPC ...................................................... 220/573.1
   See application file for complete search history.

(56) References Cited

U.S. PATENT DOCUMENTS

| | | | | |
|---|---|---|---|---|
| 2003/0209153 | A1* | 11/2003 | Sharpe | A47J 45/068 |
| | | | | 99/422 |
| 2007/0095215 | A1* | 5/2007 | Ho | A47J 45/068 |
| | | | | 99/342 |
| 2015/0208845 | A1* | 7/2015 | Robbins | A47J 36/00 |
| | | | | 206/459.1 |
| 2017/0099990 | A1* | 4/2017 | Magnouloux | A47J 37/108 |
| 2018/0338644 | A1 | 11/2018 | Gossens et al. | |

FOREIGN PATENT DOCUMENTS

| | | | | |
|---|---|---|---|---|
| CN | 110179373 A * | 8/2019 | ............ | A47J 45/068 |
| DE | 202004009968 U1 | 9/2004 | | |
| WO | WO-2004008923 A2 * | 1/2004 | .............. | A47J 37/10 |
| WO | WO-2020086435 A1 * | 4/2020 | ............ | A47J 45/061 |

* cited by examiner under 35 U.S.C. § 371 of International Application No. PCT/EP2021/067976, filed on Jun. 30, 2021, and claims benefit to German Patent Application No. DE 10 2020 119 938.4, filed on Jul. 29, 2020. The International Application was published in German on Feb. 3, 2022 as WO/2022/022932 under PCT Article 21(2).

COOKWARE ITEM HAVING AN OUTPUT UNIT AND METHOD FOR OPERATING THE COOKWARE ITEM

CROSS-REFERENCE TO PRIOR APPLICATIONS

This application is a U.S. National Phase application under 35 U.S.C. § 371 of International Application No. PCT/EP2021/067976, filed on Jun. 30, 2021, and claims benefit to German Patent Application No. DE 10 2020 119 938.4, filed on Jul. 29, 2020. The International Application was published in German on Feb. 3, 2022 as WO/2022/022932 under PCT Article 21(2).

FIELD

The invention relates to a cookware item having an output unit for visually outputting information to a user of the cookware item and to a method for operating a cookware item.

BACKGROUND

Such cookware items and methods for operating the same are already known in the prior art. The known cookware items include a cooking container for receiving food to be cooked, optionally a lid for closing the cooking container, at least one handle for handling the cookware item, a handle body of the handle being force-transmittingly connected to the cooking container and/or to the lid by means of a handle connection part of the handle, and an insulating part of the cookware item being disposed between the handle connection part and the cooking container or the lid in order to reduce the transfer of heat from the cookware item to the handle body, the known cookware items further including an output unit at least partially integrated into the handle body and used for visually outputting information to a user of the cookware item, the output unit having at least one light source, and the light source being controllable by a controller of the cookware item and capable of being supplied with electrical power by a power source of the cookware item.

SUMMARY

In an embodiment, the present invention provides a cookware item, comprising: a cooking container configured to receive food to be cooked and/or a lid configured to close the cooking container; at least one handle configured to handle the cookware item, a handle body of the handle being force-transmittingly connected to the cooking container and/or to the lid of the cookware item by a handle connection part of the handle; an insulating part of the cookware item being disposed between the handle connection part and/or the lid to reduce a transfer of heat to the handle body; and an output unit at least partially integrated into the handle body and configured to visually output information to a user of the cookware item, the output unit having at least one light source, the light source being controllable by a controller of the cookware item and configured to be supplied with electrical power by a power source of the cookware item, wherein the insulating part comprises an optical waveguide having at least one light in-coupling point configured to couple light emitted by the light source into the insulating part and at least one light out-coupling point configured to couple the light out of the insulating part, the light in-coupling point being disposed on the handle body and the light out-coupling point being disposed on an externally visible surface of the insulating part.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
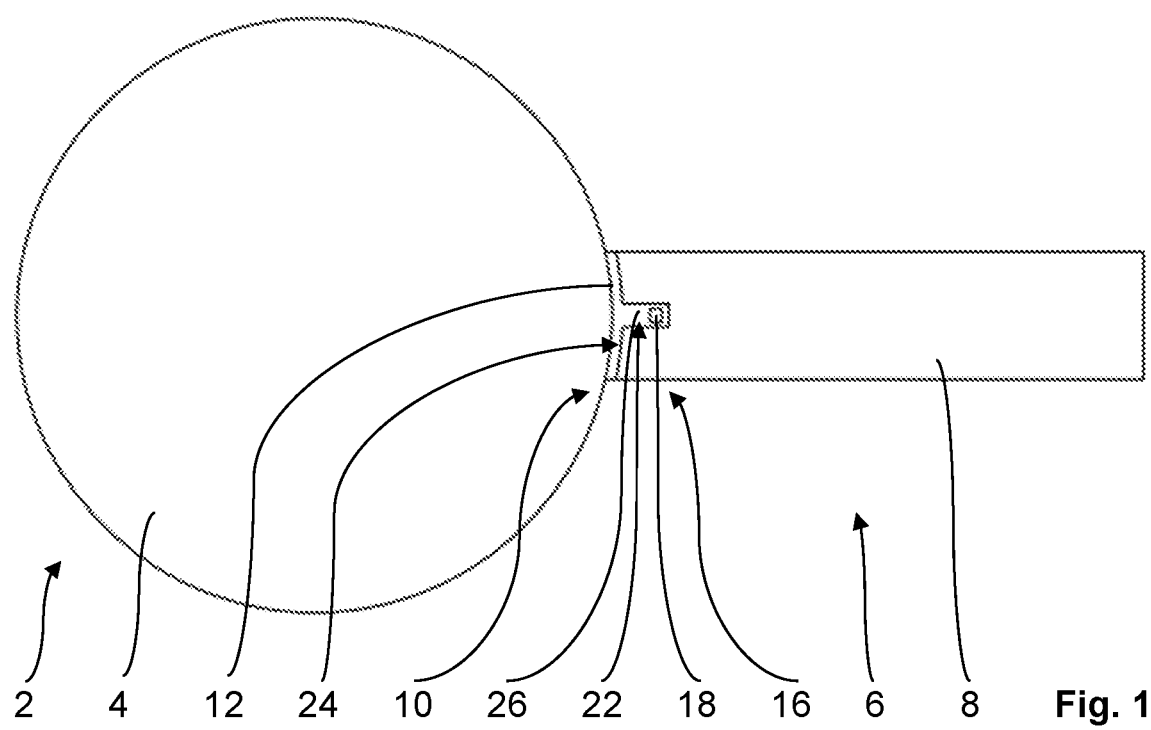
FIG. 1 is a plan view of a first exemplary embodiment of the inventive cookware item, shown without a cover.
Figure 7:
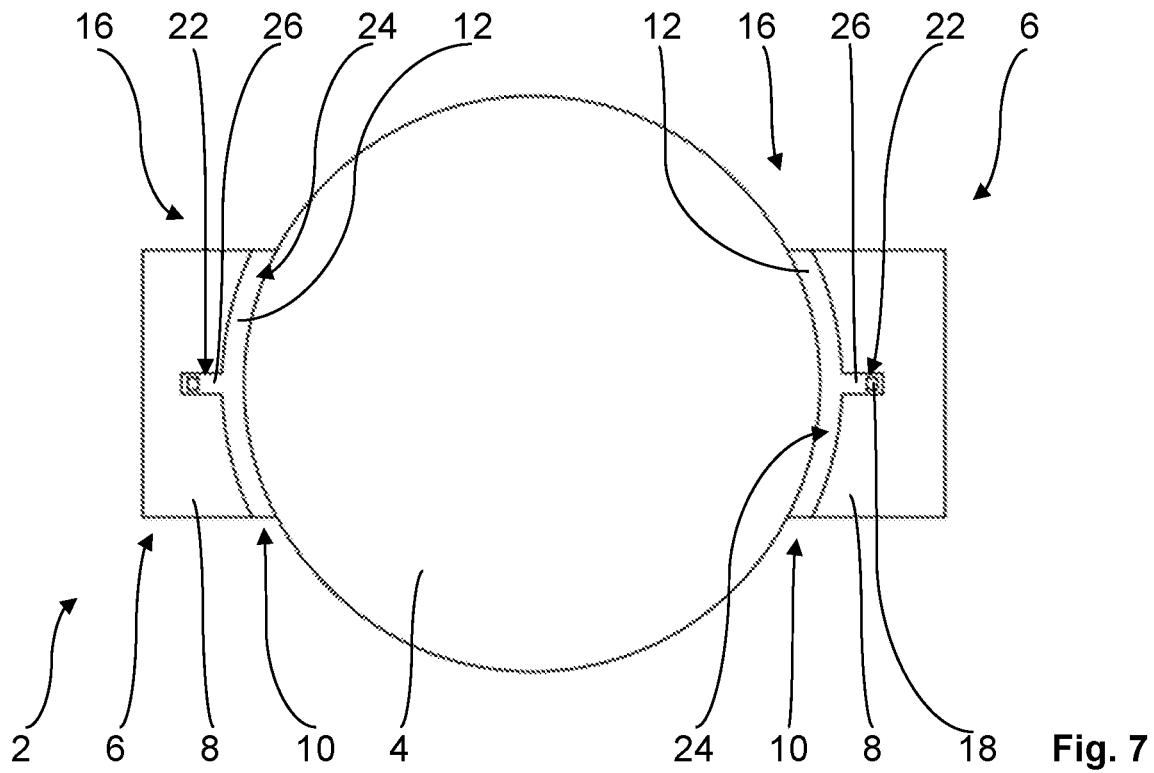
FIG. 7 is a plan of a second exemplary embodiment of the inventive cookware item, shown without a cover.

In an embodiment, the present invention provides an improved cookware item and a method for operating a cookware item.

In an embodiment, the present invention provides a cookware item which is characterized in that the insulating part is configured as an optical waveguide having at least one light in-coupling point for coupling light emitted by the light source into the insulating part and at least one light out-coupling point for coupling this light out of the insulating part, the light in-coupling point being disposed on the handle body and the light out-coupling point being disposed on an externally visible surface of the insulating part. In an embodiment, the present invention provides a method for operating a cookware item, whereby the at least one light source is controlled by the controller as a function of an operating state of the cookware item and/or of a cooktop on which the cookware item is placed, and/or as a function of an association and/or non-association of the cookware item with a cooking zone of the cooktop, and/or as a function of a temperature condition of the cookware item, and/or as a function of a fault condition of the cookware item and/or of the cooktop. The cookware item according to the invention may be, for example, a pot, a pan, a roaster, a kettle, or the like. The cookware item according to the invention may be suitable for a cooktop in the form of an induction cooktop. The handle connection part may be configured as a separate part that is connected to the handle body or as an integral part of the handle body. The at least one light source may be in the form of, for example, at least one LED and may be capable of emitting light of one color or of emitting light in multiple colors. The at least one light source may be controllable and controlled in such a way that the light emitted by this light source flashes, pulsates and/or shines constantly for a predetermined period of time.

An advantage provided by the invention is, in particular, that a cookware item and a method for operating a cookware item are improved. The inventive design of the cookware item and of the method for operating the same allows, for example, information about the cookware item and/or about a cooktop on which the cookware item is placed to be output to a user of the cookware item in a structurally simple and intuitively comprehensible manner with simple circuitry. This also makes the overall operation of the cookware item more intuitive. Furthermore, the aforementioned output of information to the user is implemented in component-saving, space-saving, and thus cost-saving manner. In particular, the space requirement aspect plays an essential role in cookware due to the very limited mounting space available in cookware.

The cookware item can, in principle, be freely selected within wide suitable limits in terms of type, function, dimensions, shape, and material. In this regard, see also the above explanations.

An advantageous refinement of the inventive cookware item provides that the insulating part be configured to be translucent. In this way, the insulating part, which is configured as an optical waveguide, is transparent to the light that is emitted by the light source and transmitted through the insulating part from its light in-coupling point to its light out-coupling point, whereas when no light is emitted by the light source, the insulating part is substantially visually opaque. Accordingly, an undesirable, because unaesthetic, view of the interior of the insulating part and possibly of the handle is thus effectively prevented. In principle, however, it is also possible to configure the insulating part such that it is transparent; i.e., such that it is both light-transmissive and permits viewing therethrough.

Another advantageous refinement of the inventive cookware item provides that the insulating part be configured as a seal, preferably as a silicone seal. This increases the functionality of the insulating part beyond the insulating function. An undesired, because unhygienic, ingress of wash water or other liquids into a space between between the insulating part on the one side and the cooking container or the lid or the handle connection part on the other side is thereby effectively prevented. The aforementioned silicone seals are advantageous for this purpose.

A further advantageous refinement of the inventive cookware item provides that the insulating part extend over at least 50% of the height of the handle body, preferably over at least 90%, preferably over at least 110%, of the height of the handle connection part. In this way, undesired transfer of heat from the cooking container or the lid to the handle body of the handle is effectively prevented or at least reduced to an acceptable degree. This applies to the preferred embodiment and in particular to the preferred embodiment of this refinement.

An advantageous refinement of the aforementioned refinement of the inventive cookware item provides that the insulating part extend over at least 50% of the height of the cooking container. This results in a good force-transmitting connection between the cooking container or the lid on the one side and the handle body of the at least one handle on the other side. This is an advantage especially in the case of heavy and/or large-volume cookware items. On the other hand, this is also associated with a large visible surface of the insulating part so that the output visually perceptible to the user of the cookware item is correspondingly larger in size. Further, the large-area contact between the handle, namely, the handle connection part, and the cooking container or the lid via the insulating part can also be used to give the cookware item an aesthetic design. This may be accomplished, for example, by the insulating part shining in a visually pleasing light color when in an operating state in which no information needs to be communicated to the user of the cookware item.

Another advantageous refinement of the inventive cookware item provides that the insulating part be disposed between the cooking container and the handle connection part or, respectively, between the lid and the handle connection part in such a way that the externally visible surface of the insulating part, including the light out-coupling point, is configured along the entire circumference of the handle connection part. This allows the information that is output via the insulating part to be substantially visible from all sides of the cookware item. Accordingly, reliable provision of information to the user of the cookware item is ensured substantially regardless of the position of the user relative to the cookware item.

A further advantageous refinement of the inventive cookware item provides that a top side of the handle body be covered by a cover of the handle. This allows the handle body, and thus the cookware item in its entirety, to be given a visually pleasing appearance in a structurally simple manner. The cover may be made of, for example, metal, plastic, or a composite material. Moreover, the material of the cover may be a transparent material, preferably a translucent material.

An advantageous refinement of the inventive cookware item provides that a section of the insulating part, including a portion of the externally visible surface of the insulating part, including the light out-coupling point, extend, starting at the handle connection part, further toward the handle body, preferably, that the aforementioned section be disposed on the top side of the handle body, preferably, that this section be covered by the cover of the handle, the cover being translucent in design in correspondence to this section. This further improves the visibility of the information that is output to the user via the insulating part. This applies to the preferred embodiment, and in particular to the preferred embodiment of this refinement, since the top side of the handle body is a point of the cookware item that is especially focused on during the operation of the cookware item; i.e., that is in the field of view of the user. In addition, the preferred embodiment of this refinement makes it possible to design the handle body in such a way that it is visually pleasing in all operating states of the cookware item. Accordingly, in this aspect, the design of the cookware item can be freely selected within wide suitable limits.

Another advantageous refinement of the inventive cookware item provides that the at least one light source be controllable by the controller as a function of an operating state of the cookware item and/or of a cooktop on which the cookware item is placed, and/or as a function of an association and/or non-association of the cookware item with a cooking zone of the cooktop, and/or as a function of a temperature condition of the cookware item, and/or as a function of a fault condition of the cookware item and/or of the cooktop. This allows the user of the cookware item, and thus the user of the cooktop on which the cookware item is placed, to be informed in an intuitive manner about essential and thus particularly important parameters during the operation of the cookware item and/or of the cooktop. The operating state of the cookware item and/or of a cooktop may be, for example, an ON state of the cookware item and/or of the cooktop. It is also conceivable that the cooking power level of a cooking zone of the cooktop on which the inventive cookware item is placed may be displayed. An association and/or non-association of the cookware item with a cooking zone of the cooktop may be indicated to the user of the cookware item, for example, by an insulating part shining in blue color. Depending on whether the insulating part flashes or shines constantly in the aforementioned color for a predetermined period of time, the cookware item may be indicated by the insulating part as either being or not being associated with the cooking zone. A temperature condition of the cookware item may be indicated to the user of the cookware item, for example, by an insulating part shining in red color. In this connection, the insulating part may provide information about, for example, residual heat of the cookware item. Depending on the intensity of the red color and/or a flashing rate of the red color, the user may be informed of a more or less high temperature of the cookware item. A fault condition of the cookware item and/or of the cooktop may also be visually output to the user of the cookware item by means of the insulating part. For example, a state of charge of the power source that is too low for proper operation of the at least one light source of the output unit of the cookware item could be signaled to the user of the cookware item by an insulating part shining in yellow color. As already explained above by way of example, in addition to the color in which the insulating part shines, a frequency of emission of the color; i.e., flashing, pulsating, or constant shining, and/or a change in color may also be used to inform the user of the cookware item in an intuitive manner about different parameters during the operation of the cookware item.

In FIGS. 1 through 6c, a first exemplary embodiment of the inventive cookware item is shown in purely schematic form.

Cookware item 2 takes the form of a pan and includes a cooking container 4 for receiving food to be cooked, a handle 6 for handling cookware item 2, a handle body 8 of handle 6 being force-transmittingly connected to cooking container 4 by means of a handle connection part 10 of handle 6, and an insulating part 12 of cookware item 2 being disposed between handle connection part 10 and cooking container 4 in order to reduce the transfer of heat from cooking container 4 to handle body 8. In the present exemplary embodiment, handle connection part 10 is an integral part of handle body 8. A top side of handle body 8 is covered by a cover 14 (in this regard, see FIGS. 2 through 4). Moreover, cookware item 2 is suitable for use on a cooktop in the form of an induction cooktop. The cooktop includes a plurality of cooking zones.

An output unit 16 for visually outputting information to a user of cookware item 2 is at least partially integrated into handle body 8, the output unit 16 having a light source 18 in the form of a multi-color LED, and the light source 18 being controllable by a controller 20 of cookware item 2 and capable of being supplied with electrical power by a power source of cookware item 2, which is integrated into controller 20.

Insulating part 12 is configured as an optical waveguide having a light in-coupling point 22 for coupling light emitted by light source 18 into insulating part 12 and a plurality of light out-coupling points 24 for coupling this light out of insulating part 12, the light in-coupling point 22 being disposed on handle body 8 and the light out-coupling points 24 being disposed on an externally visible surface of insulating part 12.

In the present exemplary embodiment, insulating part 12 is configured to be translucent so that light emitted by light source 18 and coupled into insulating part 12 via light in-coupling point 22 can be coupled out of insulating part 12 via light out-coupling points 24. Also, when no light is emitted by light source 18, insulating part 12 is substantially not transparent; i.e., visually opaque, to the user of cookware item 2. Furthermore, insulating part 12 is here configured as a seal, namely as a silicone seal.

Figure 2:
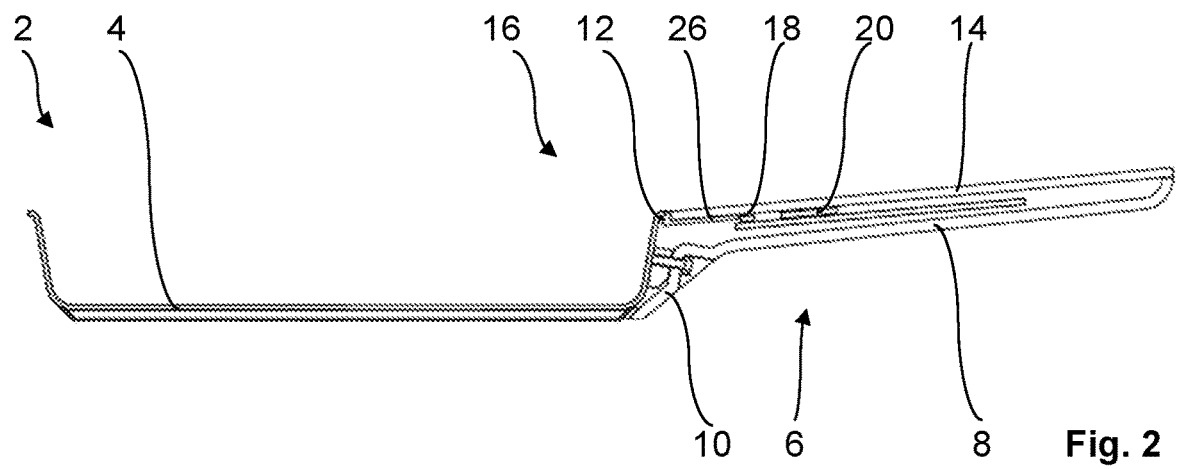
FIG. 2 is a sectional side view of the first exemplary embodiment.
Figure 3:
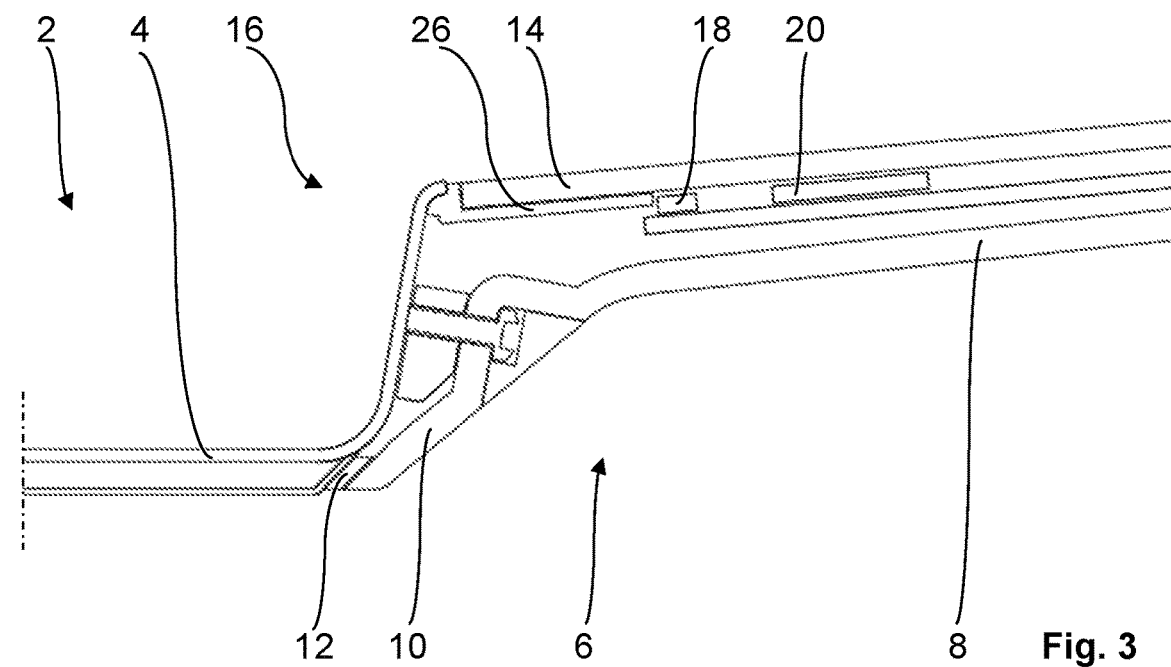
FIG. 3 is an enlarged detail view of the first exemplary embodiment according to FIG. 2, showing the region of the insulating part.
Figure 4:
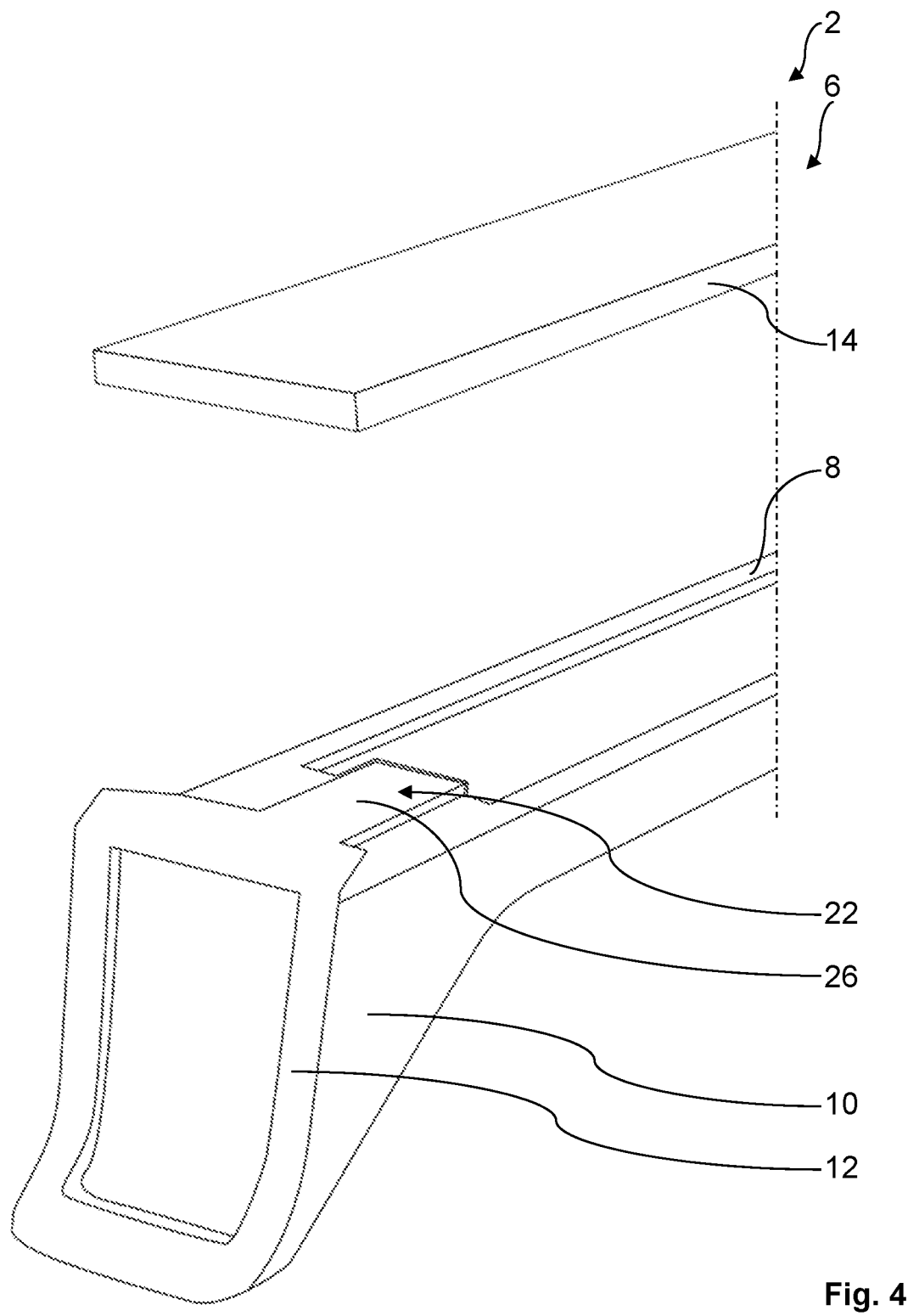
FIG. 4 is a partial perspective exploded view of the first exemplary embodiment.

In FIGS. 2 through 4, the design of the cookware item according to the first exemplary embodiment is shown in more detail. Viewing FIGS. 1 through 4 together, it can be readily seen that insulating part 12 is disposed between cooking container 4 and handle connection part 10 in such a way that the externally visible surface of insulating part 12, including light out-coupling points 24, is configured along the entire circumference of handle connection part 10. As can further be seen from FIGS. 1 through 4 a section 26 of insulating part 12 extends, starting at handle connection part 10, further toward handle body 8, the aforementioned section 26 being disposed on the top side of handle body 8 and being covered by cover 14 of handle 6. In contrast, in an alternative embodiment of the inventive cookware item, it would be conceivable that a section of the insulating part, including a portion of the externally visible surface of the insulating part, including the at least one light out-coupling point, may extend, starting at the handle connection part, further toward the handle body, preferably, that the aforementioned section may be disposed on the top side of the handle body, preferably, that this section may be covered by the cover of the handle, the cover being translucent in design in correspondence to this section. However, this is not the case in the present first exemplary embodiment.

In the present exemplary embodiment, light source 18 is controllable by controller 20 as a function of an operating state of cookware item 2 and of the cooktop on which the cookware item is placed, and as a function of an association and/or non-association of cookware item 2 with a cooking zone of the cooktop, and as a function of a temperature condition of cookware item 2, and as a function of a fault condition of cookware item 2 and of the cooktop. This will be explained in greater detail below.

Figure 5:
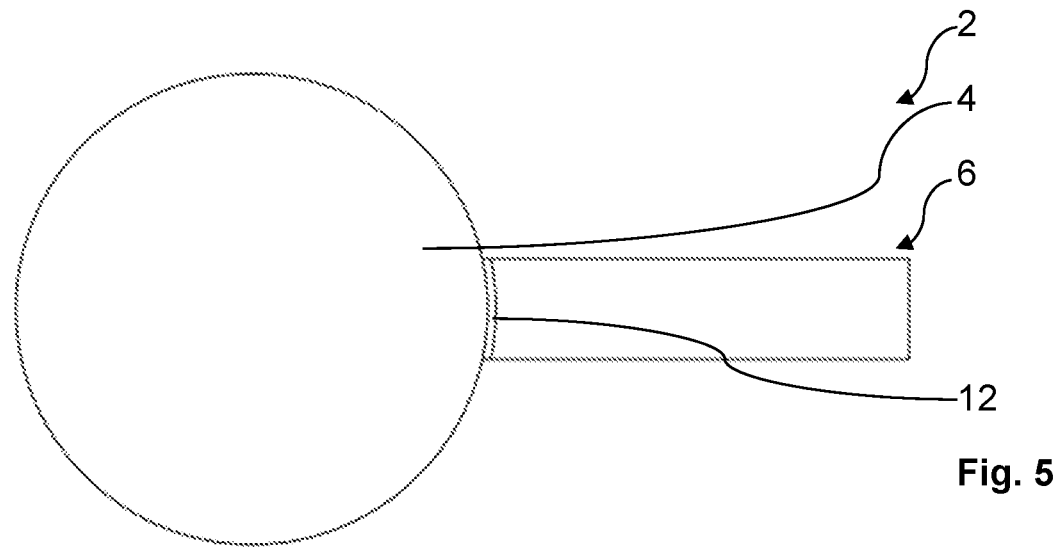
FIG. 5 is a view of the first exemplary embodiment according to FIG. 1, shown with a cover.
Figure 6A:
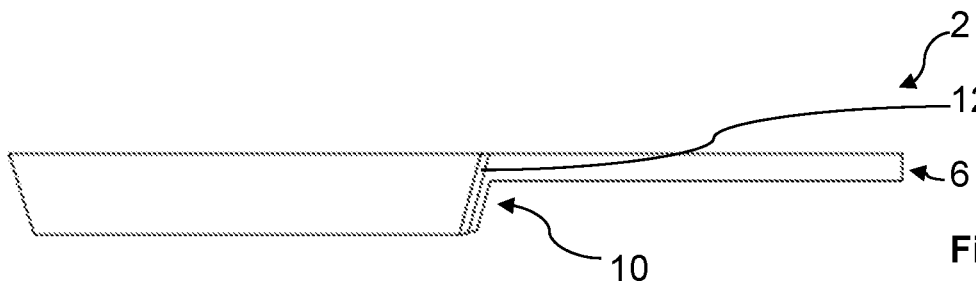
FIGS. 6*a-c* are side views showing three variants of the first exemplary embodiment.
Figure 6B:
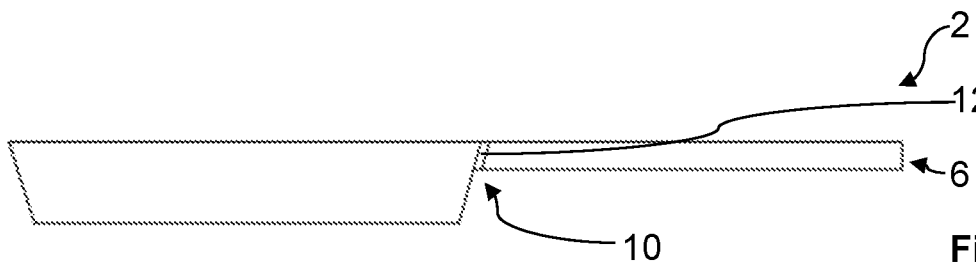
Figure 6C:
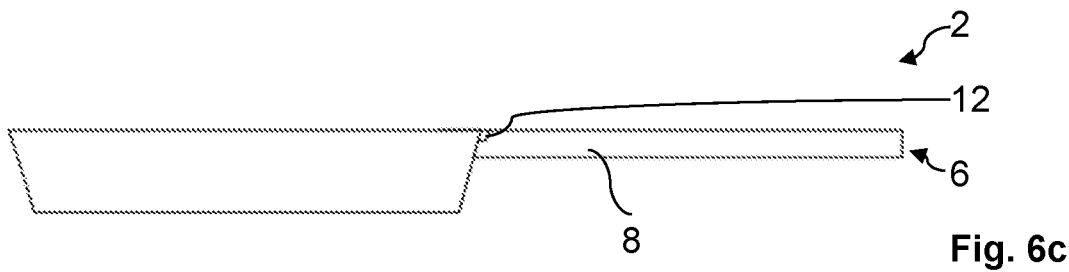
Figure 8:
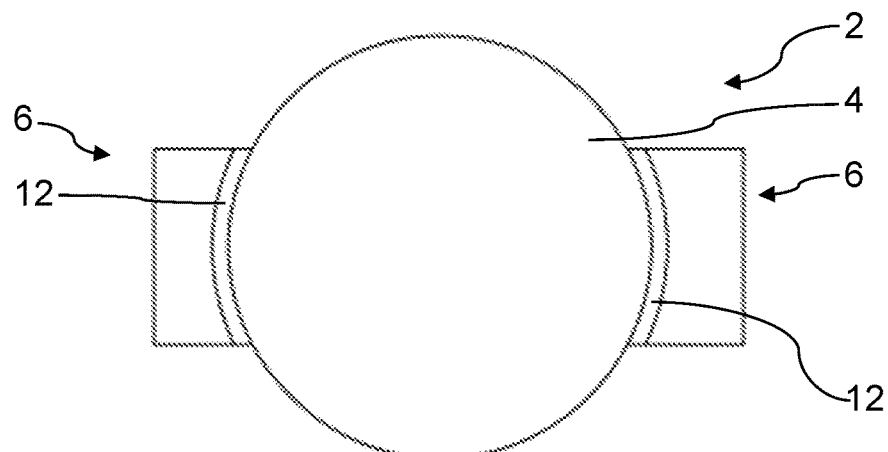
FIG. 8 is a view of the second exemplary embodiment according to FIG. 7, shown with a cover.

In FIGS. 5 through 6c, a total of three design variants of the first exemplary embodiment are shown in purely schematic form. Here, the three variants differ only in terms of construction and are otherwise configured identically, for example in terms of circuitry and with respect to the control of light source 18 by means of controller 20. According to the first variant shown in FIGS. 1 through 5 and 6a, insulating part 12 extends over about 110% of the height of handle connection part 10. Moreover, in this first variant, insulating part 12 extends over the entire height of cooking container 4.

In contrast, in the second variant according to FIG. 6b, insulating part 12 extends over 100% of the height of handle connection part 10, and in the third variant according to FIG. 6c, over 50% of the height of handle body 8.

In the following, the operation of the inventive cookware item and of the inventive method according to the first exemplary embodiment will be briefly described with reference to FIGS. 1 through 6c.

The user places cookware item 2, in a manner known to those skilled in the art, on one of the cooking zones of the cooktop. As already explained above, the present exemplary embodiment provides that a light source 18 be controllable by controller 20 as a function of an operating state of cookware item 2 and of the cooktop on which the cookware item is placed, and as a function of an association and/or non-association of cookware item 2 with a cooking zone of the cooktop on which cookware item 2 has been placed by the user, and as a function of a temperature condition of cookware item 2, and as a function of a fault condition of cookware item 2 and of the cooktop. This allows the user of cookware item 2, and thus the user of the cooktop on which cookware item 2 is placed, to be informed in an intuitive manner about essential and thus particularly important parameters during the operation of cookware item 2 and/or of the cooktop.

The operating state of cookware item 2 and/or of the cooktop may be, for example, an ON state of cookware item 2 and/or of the cooktop. In addition, it is conceivable that the user-set cooking power level of the cooking zone of the cooktop on which the inventive cookware item is placed may be displayed. In the present exemplary embodiment, an association and non-association of cookware item 2 with the cooking zone of the cooktop on which cookware item 2 has been placed by the user is indicated to the user of cookware item 2 by insulating part 12 shining in blue color. Depending on whether insulating part 12 flashes or shines constantly in the aforementioned color for a predetermined period of time, an indication is provided via insulating part 12 to the user as to whether or not cookware item 2 is associated with the aforementioned cooking zone. A temperature condition of cookware item 2 may be indicated to the user of cookware item 2, for example, by insulating part 12 shining in red color. In this connection, insulating part 12 informs the user about, for example, residual heat of cookware item 2. Depending on the intensity of the red color and/or a flashing rate of the red color, the user is informed of a more or less high temperature of the cookware item.

In the present exemplary embodiment, a fault condition of cookware item 2 and/or of the cooktop is also visually output to the user of cookware item 2 by means of insulating part 12. For example, a state of charge of the power source integrated into controller 20 that is too low for proper operation of light source 18 of output unit 16 of cookware item 2 is signaled to the user of cookware item 2 by insulating part 12 shining in yellow color. As already explained above by way of example, in addition to the color in which insulating part 12 shines, a frequency of emission of the color; i.e., flashing, pulsating, or constant shining, and/or a change in color may also be used to inform the user of cookware item 2 in an intuitive manner about different parameters, e.g., the parameters mentioned above, during the operation of cookware item 2.

In FIGS. 7 through 9c, a second exemplary embodiment of the inventive cookware item is shown in purely schematic form, the second exemplary embodiment being substantially identical to the first exemplary embodiment in terms of construction, circuitry, and control. Accordingly, reference can largely be made here to the explanations regarding the first exemplary embodiment. Like or functionally equivalent components are denoted by the same reference numerals.

In contrast to the first exemplary embodiment, the cookware item 2 of the second exemplary embodiment takes the form of a pot. Accordingly, in the second exemplary embodiment, cookware item 2 has two handles 2 in place of one handle. In this regard, see FIGS. 7 through 9c.

Otherwise, the second exemplary embodiment of the inventive cookware item is configured analogously to the first embodiment. The same applies to the mode of operation thereof.

The second exemplary embodiment of the inventive cookware item is also shown, by way of example, in a total of three variants in FIGS. 7 through 9c, the three variants of the second exemplary embodiment being similar to those of the first exemplary embodiment, considering the structural differences mentioned above.

Analogously to the first exemplary embodiment, the three variants of the second exemplary embodiment also differ from one another only in terms of construction and are otherwise configured identically, for example in terms of circuitry and with respect to the control of light source 18 by means of controller 20. According to the first variant of the second exemplary embodiment, shown in FIGS. 7 through 9a, insulating part 12 extends over about 110% of the height of handle connection part 10. Moreover, in this first variant, insulating part 12 extends over the entire height of cooking container 4.

Figure 9A:
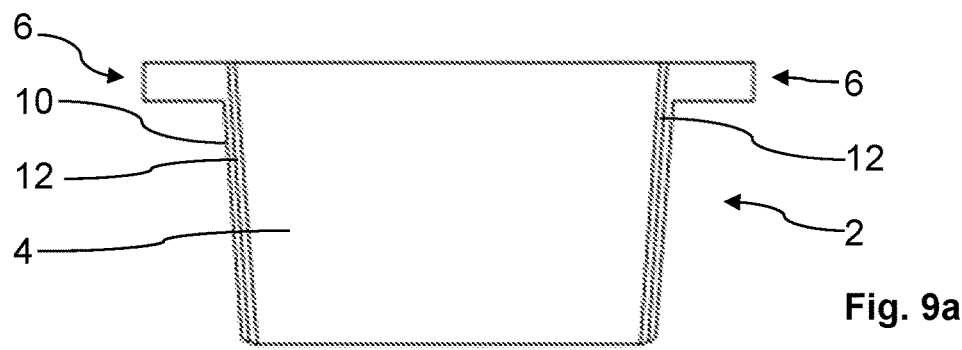
FIGS. 9*a-c* are side views showing three variants of the second exemplary embodiment.
Figure 9B:
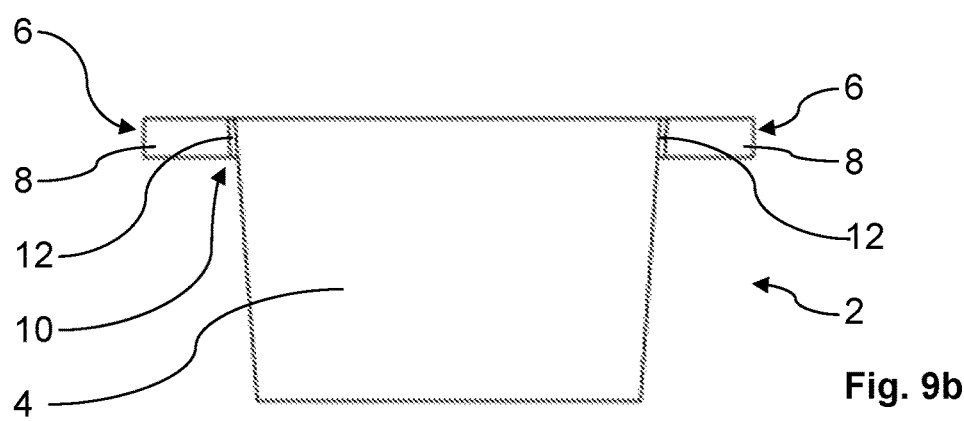
Figure 9C:
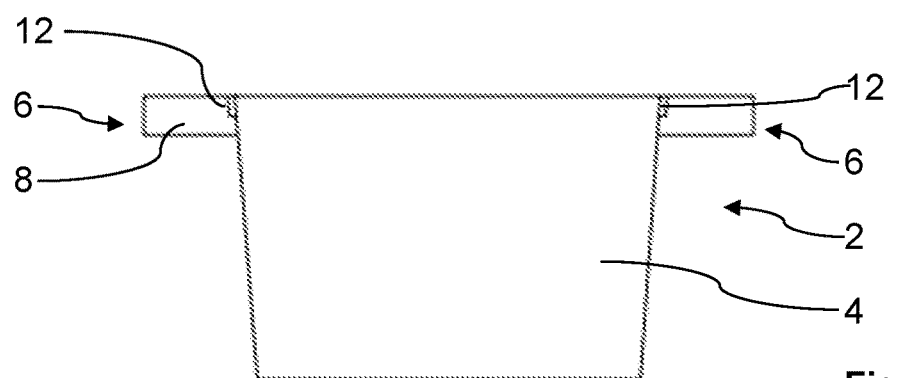

In contrast, in the second variant according to FIG. 9b, insulating part 12 extends over 100% of the height of handle connection part 10, which, in the second exemplary embodiment, corresponds to 100% of the height of handle body 8. In the third variant according to FIG. 9c, the insulating part extends over only 50% of the height of handle body 8.

As already explained above, considering the above-mentioned structural differences, the operation of the inventive cookware item and of the inventive method according to the second exemplary embodiment correspond to those of the first exemplary embodiment, so that, in this respect, reference is made to the above explanations regarding the first exemplary embodiment.

The invention is not limited to the exemplary embodiments described. The cookware item can be freely selected within wide suitable limits in terms of type, function, dimensions, shape, and material. The cookware item according to the invention may also be, for example, a kettle or the like. As in the present exemplary embodiments, the inventive cookware item may be suitable for a cooktop in the form of an induction cooktop. However, this is not absolutely necessary. The handle connection part may be configured as a separate part that is connected to the handle body or as an integral part of the handle body. The insulating part does not necessarily have to be configured as a seal at the same time. Also, the material of the insulating part that is at the same time configured as seal is not limited to silicone.

As in the present exemplary embodiments, the at least one light source may be in the form of at least one LED and may be capable of emitting light of one color or of emitting light in multiple colors. However, the at least one light source can be freely selected within wide suitable limits. Those skilled in the art will make a suitable selection depending on the requirements of the particular case. The at least one light source may be controllable and controlled by the controller in such a way that the light emitted by this light source flashes, pulsates and/or shines constantly for a predetermined period of time. As in the exemplary embodiments, the light may be of different colors. However, this is not absolutely necessary. The light source may also be configured as a light source that emits only monochromatic light. It is also conceivable that a plurality of monochromatic light sources may be used, these light sources then being controllable by the controller in such a manner that the insulating part shines in different colors of light as desired.

In order to further improve the visibility of the information that is output to the user via the insulating part, it may be provided that a section of the insulating part, including a portion of the externally visible surface of the insulating part, including the at least one light out-coupling point, extend, starting at the handle connection part, further toward the handle body, preferably, that the aforementioned section be disposed on the top side of the handle body, preferably, that this section be covered by the cover of the handle, the cover being translucent in design in correspondence to this section. This applies to the preferred embodiment, and in particular to the preferred embodiment of this refinement, since the top side of the handle body is a point of the cookware item that is especially focused on during the operation of the cookware item; i.e., that is in the field of view of the user. In addition, the preferred embodiment of this refinement makes it possible to design the handle body in such a way that it is visually pleasing in all operating states of the cookware item. Accordingly, in this aspect, the design of the cookware item can be freely selected within wide suitable limits.

Figure 10:
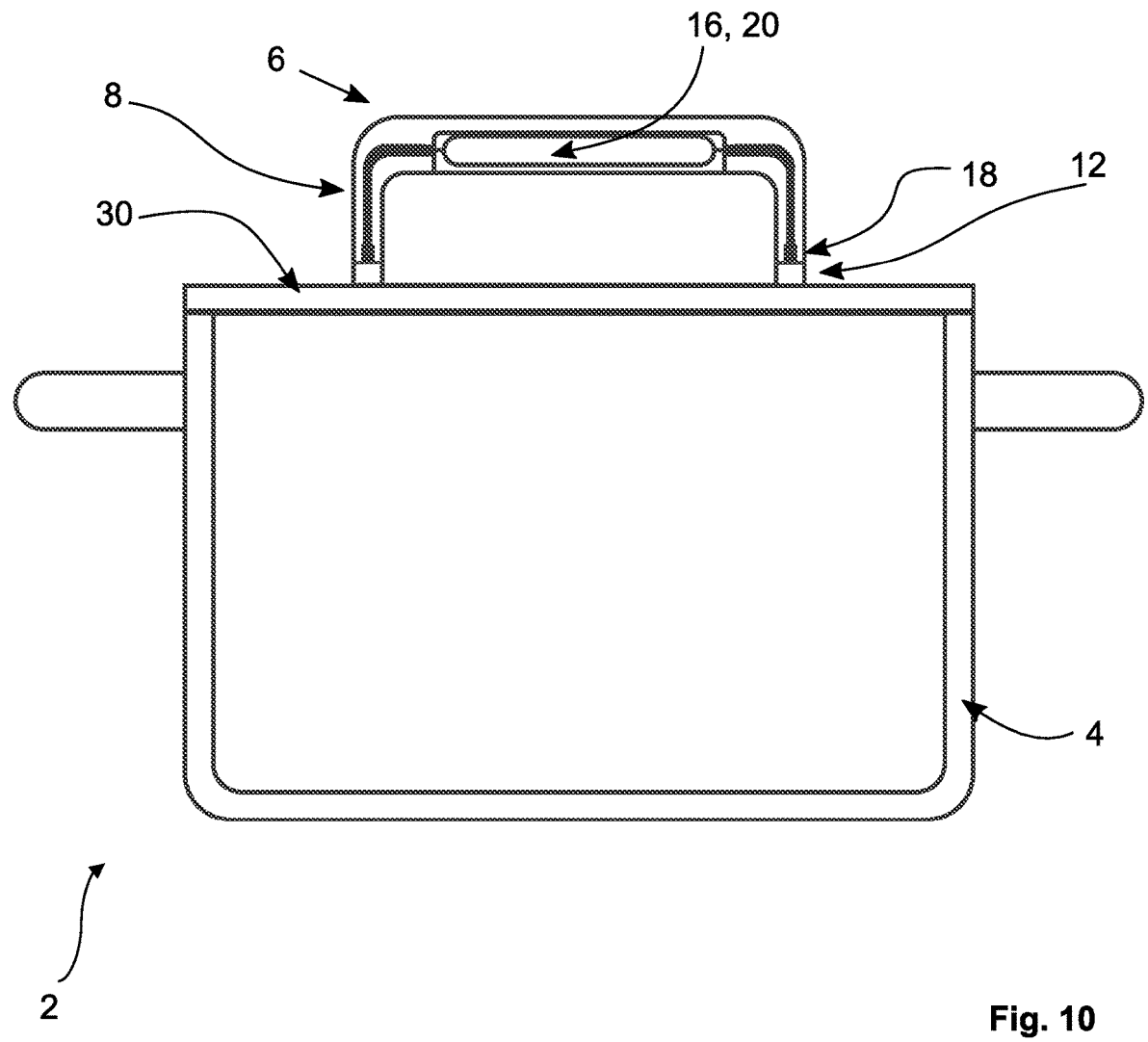
FIG. 10 is a sectional view of a third exemplary embodiment of the inventive cookware item, shown with a cover.

In FIG. 10, there is shown a lid 30 of a cookware item 2. Lid 30 serves to close cooking container 4. Lid 30 has provided thereon a handle 6 for handling cookware item 2, in particular for handling lid 30. Handle 6 has a handle body 8. Handle body 8 is force-transmittingly connected to lid 30 via a handle connection part of handle 6. An insulating part 12 of cookware item 2 is disposed between the handle connection part and lid 30 in order to reduce the transfer of heat from lid 30 to handle body 8. An output unit 16 for visually outputting information to a user of cookware item 2 is at least partially integrated into handle body 8, the output unit 16 having a light source 18 in the form of a multi-color LED, and the light source 18 being controllable by a controller 20 of cookware item 2 and capable of being supplied with electrical power by a power source of cookware item 2, which is integrated into controller 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cookware item, comprising:
    a cooking container configured to receive food to be cooked and/or a lid configured to close the cooking container;
    at least one handle configured to handle the cookware item,
    a handle body of the handle being force-transmittingly connected to the cooking container and/or to the lid of the cookware item by a handle connection part of the handle;
    an insulating part of the cookware item being disposed between the handle connection part and/or the lid to reduce a transfer of heat to the handle body; and
    an output unit at least partially integrated into the handle body and configured to visually output information to a user of the cookware item,
    the output unit having at least one light source,
    the light source being controllable by a controller of the cookware item and configured to be supplied with electrical power by a power source of the cookware item,
    wherein
    the insulating part comprises an optical waveguide having at least one light in-coupling point configured to couple light emitted by the light source into the insulating part and at least one light out-coupling point configured to couple the light out of the insulating part,
    the light in-coupling point being disposed on the handle body and the light out-coupling point being disposed on an externally visible surface of the insulating part.

2. The cookware item of claim 1, wherein the insulating part is translucent.

3. The cookware item of claim 1, wherein the insulating part comprises a seal.

4. The cookware item of claim 3, wherein the seal comprises a silicone seal.

5. The cookware item of claim 1, wherein the insulating part extends over at least 50% of a height of the handle body.

6. The cookware item of claim 5, wherein the insulating part extends over at least 50% of a height of the cooking container.

7. The cookware item of claim 5, wherein the insulating part extends over at least 90% of the height of the handle body.

8. The cookware item of claim 7, wherein the insulating part extends over at least 110% of a height of the handle connection part.

9. The cookware item of claim 1, wherein the insulating part is disposed between the cooking container and the handle connection part and/or between the lid and the handle connection part such that the externally visible surface of the insulating part, including the light out-coupling point, is disposed along an entire circumference of the handle connection part.

10. The cookware item of claim 1, wherein a top side of the handle body is covered by a cover of the handle.

11. The cookware item of claim 1, wherein a section of the insulating part, including a portion of the externally visible surface of the insulating part, including the light out-coupling point, extends, starting at the handle connection part, farther toward the handle body.

12. The cookware item of claim 11, wherein the section of the insulating part is disposed on the top side of the handle body.

13. The cookware item of claim 12, wherein the section of the insulating part is covered by the cover of the handle, the cover being translucent in correspondence with the section.

14. The cookware item of claim 1, wherein the at least one light source is controlled by the controller as a function of an operating state of the cookware item and/or of a cooktop on which the cookware item is placed, and/or as a function of an association and/or non-association of the cookware item with a cooking zone of the cooktop, and/or as a function of a temperature condition of the cookware item, and/or as a function of a fault condition of the cookware item and/or of the cooktop.

15. A method for operating the cookware item of claim 1, comprising:
   controlling the at least one light source by the controller as a function of an operating state of the cookware item and/or of a cooktop on which the cookware item is placed, and/or as a function of an association and/or non-association of the cookware item with a cooking zone of the cooktop, and/or as a function of a temperature condition of the cookware item, and/or as a function of a fault condition of the cookware item and/or of the cooktop.

* * * * *